US012600204B2

(12) United States Patent
Caliaro et al.

(10) Patent No.: US 12,600,204 B2
(45) Date of Patent: Apr. 14, 2026

(54) DECORATIVE GLASS PANEL WITH THE APPEARANCE OF A NOBLE MATERIAL

(71) Applicant: AGC GLASS EUROPE, Louvain-la-Neuve (BE)

(72) Inventors: Sébastien Caliaro, Morialme (BE); Thomas Lambricht, Perwez (BE); Cécile Musialski, Gosselies (BE); Charlotte Jacob, Gosselies (BE); Florent Delsaux, Gosselies (BE)

(73) Assignee: AGC GLASS EUROPE, Louvain-la-neuve (BE)

( * ) Notice: Subject to any disclaimer, the term of this patent is extended or adjusted under 35 U.S.C. 154(b) by 376 days.

(21) Appl. No.: 18/254,051

(22) PCT Filed: Dec. 9, 2021

(86) PCT No.: PCT/EP2021/085100
§ 371 (c)(1),
(2) Date: May 23, 2023

(87) PCT Pub. No.: WO2022/128753
PCT Pub. Date: Jun. 23, 2022

(65) Prior Publication Data
US 2024/0092149 A1 Mar. 21, 2024

(30) Foreign Application Priority Data
Dec. 16, 2020 (EP) ..................................... 20214745

(51) Int. Cl.
*B32B 3/30* (2006.01)
*B32B 3/26* (2006.01)
(Continued)

(52) U.S. Cl.
CPC ............... *B60J 1/001* (2013.01); *B32B 3/266* (2013.01); *B32B 3/30* (2013.01); *B60Q 3/50* (2017.02);
(Continued)

(58) Field of Classification Search
CPC ................................. B32B 3/266; C03C 17/34
See application file for complete search history.

(56) References Cited

U.S. PATENT DOCUMENTS

| | | | |
|---|---|---|---|
| 10,663,176 B2 | 5/2020 | Charpentier et al. | |
| 2010/0154261 A1* | 6/2010 | Bozlo ................... | G09F 21/049 156/247 |

(Continued)

OTHER PUBLICATIONS

WO 2019/055469 (Year: 2019).*
International Search Report issued Feb. 8, 2022 in PCT/EP2021/085100 filed on Dec. 9, 2021, 3 pages.

*Primary Examiner* — Elizabeth E Mulvaney
(74) *Attorney, Agent, or Firm* — Oblon, McClelland, Maier & Neustadt, L.L.P.

(57) ABSTRACT

A glass panel having a noble material appearance, including in order: a glass sheet having a luminous transmission LTD of at least 85% and having a thickness in a range of 0.1 mm to 6 mm, a decorative layer having a noble material pattern and where the decorative layer is continuous, an opaque top layer where the opaque top layer is discontinuous. The glass panel thereby has opaque zones defined by an optical density OD>1.5, and semi-transparent zones that correspond to one or several patterns and defined by a luminous transmission LTD of from 3 to 80%.

19 Claims, 5 Drawing Sheets

(51) Int. Cl.
  *B60J 1/00*        (2006.01)
  *B60Q 3/50*        (2017.01)
  *B60Q 3/70*        (2017.01)
  *C03C 17/34*       (2006.01)

(52) U.S. Cl.
  CPC ................ *B60Q 3/70* (2017.02); *C03C 17/34*
      (2013.01); *C03C 2217/72* (2013.01); *C03C*
                          *2218/119* (2013.01)

(56)                References Cited

U.S. PATENT DOCUMENTS

| | | | |
|---|---|---|---|
| 2011/0002138 A1* | 1/2011 | Hayes ................. | B29C 45/1671 |
| | | | 362/249.16 |
| 2017/0016628 A1 | 1/2017 | Charpentier et al. | |
| 2021/0300265 A1* | 9/2021 | Piccin ..................... | B60Q 3/54 |
| 2025/0178525 A1* | 6/2025 | Runfola ................... | B60Q 3/54 |

\* cited by examiner (a)

(b)                    (c)

(a)

(b)

DECORATIVE GLASS PANEL WITH THE APPEARANCE OF A NOBLE MATERIAL

CROSS REFERENCE TO RELATED APPLICATIONS

This application is a National Stage entry under 35 U.S.C. § 371 of PCT/EP2021/085100, filed Dec. 9, 2021, and claims priority to European Patent Application No. 20214745.0, filed Dec. 16, 2020. The entire contents of both are incorporated herein by reference.

1. FIELD OF THE INVENTION

The present invention relates to a decorative glass panel. More particularly, the present invention relates to a decorative glass panel particularly advantageous for automotive applications as a vehicle's interior glazing, simulating the appearance of a noble material and allowing the visualization of an illuminated sign/pattern/logo through one of its main face when it is back-lighted.

2. BACKGROUND ART

In the automotive market, there is a need for use as vehicle's interior glazings, especially in luxury car segment, to have products in the form of a sheet/panel (flat or bent) and having the appearance (real or simulated) of a noble material like wood, marble, stone, granite, leather, etc. Next to their luxurious aesthetical look, such product should have some technical specifications, required by the automotive domain: light-weight, mechanical resistance (impact, scratches), ideally easy-cleaning property and their easy and cost-effective manufacturing (ideally through mass production).

Composite of glass with noble materials are already known in the art. They are generally composed of a glass sheet (a few millimeters) laminated with a sheet of a chosen material like wood (down to 0.3 mm) or stone (a few millimeters). Such products have several benefits: next to their real appearance of the used noble material, they have also the advantages of the glass material/surface itself (mechanical resistance, smooth surface, etc.). However, they show a lot of drawbacks, amongst which:

- Their thickness is relatively high—the noble material in the form of a sheet representing the main limitation;
- Their weight is generally high, especially if stone or granite is used—this is a serious limitation if one considers automotive applications;
- Their cost is also high, due to the cost of the noble material itself but also due to manufacturing (this is not straightforward to get a very thin sheet of most noble material);
- The flexibility in term of process is very low—mass production is complicated and it is impossible to use the same manufacturing process/line to get products with the appearance of all desired noble materials.

For these reasons, this type of solutions (glass/noble material composite laminates) is not considered in general and especially when applications as vehicle's interior glazings are concerned.

Next to that, in such laminates, the noble materials is opaque or quasi-opaque even if in the form of a thin sheet and, therefore, they are not appropriate when considering back-lighting, i.e. to visualize a sign/logo/pattern through the laminate.

Tough, there is a demand from the market, especially the automotive market, i.e. the luxury cars segment, to have a decorative panel (i) having the appearance of a noble material (wood, marble, stone, granite, leather, etc.), (ii) being lightweight and mechanically resistant, (iii) with an easy and cost-effective manufacturing process, and finally (iv) which allows the visualization of an illuminated sign/pattern/logo through one of its main face when it is back-lighted.

3. OBJECTIVES OF THE INVENTION

The present invention has notably the objective of overcoming the drawbacks of the state-of-the-art.

More particularly, an objective of the present invention is to provide a glass panel having the appearance of a noble material which is lightweight and mechanically resistant.

Another objective of the present invention is to provide a glass panel having the appearance of a noble material which allows the sharp visualization of an illuminated sign/pattern/logo through one of its main face when it is back-lighted.

Another objective of the present invention is to provide a solution to the disadvantages of the prior art that is simple, quick and easy to manufacture and, above all, economical. In particular, an objective is to provide a glass panel having the appearance of a noble material which can be manufactured in a flexible way and in a customizable way for the customer.

4. DESCRIPTION OF THE INVENTION

The present invention relates to a glass panel with the appearance of a noble material, comprising in order:
- a glass sheet (2) having a luminous transmission LTD of at least 85% and having a thickness in a range of 0.1 mm to 6 mm;
- a decorative layer (3) representing the noble material pattern and which is continuous;
- an opaque top layer (4) which is discontinuous;
said glass panel thereby showing:
- opaque zones (6) defined by an optical density OD>1.5; and
- semi-transparent zones (7) that correspond to one or several pattern(s) and defined by a luminous transmission LTD of from 3 to 80%.

Hence, the invention lies on a novel and inventive approach since it enables to find a solution for the disadvantages of prior art.

Throughout present description and claims, when a range is indicated, the extremities are included. In addition, all the integral and subdomain values in the numerical range are expressly included as if explicitly written.

In present description and claims, to quantify the luminous transmittance, one considers the total light transmission with illuminant D65 (LTD) at a solid angle of observation of 2° (according to standard 1509050). The light transmission represents the percentage of light flux emitted between wavelengths 380 nm and 780 nm which is transmitted through the glass panel.

Also, in present description and claims, one considers CIELab values: L*, a* and b*, characterizing colour aspect of layers. CIE L*a*b* parameters are considered in the following description in reflection and with the following measurement parameters: illuminant D, 10°, SCI, white tile as background.

Also, in present description and claims, one considers optical density or OD. OD is a measure of absorbance, and is defined as the ratio of the intensity of light falling upon a material and the intensity transmitted through this material. Optical density is generally defined by the equation, $OD=\log_{10}(I0/I1)$ where $I0$ is the intensity of visible light incident upon a small area of the material and $I1$ is the intensity of light transmitted by that region of the material.

Other features and advantages of the invention will be made clearer from reading the following description of preferred embodiments and FIGS. 1-5, given by way of simple illustrative and non-restrictive examples:

FIG. 1 shows the principle of the invention and illustrates schematically a glass panel according to the invention;

FIG. 2 schematically illustrates an embodiment of the invention;

Figure 4:
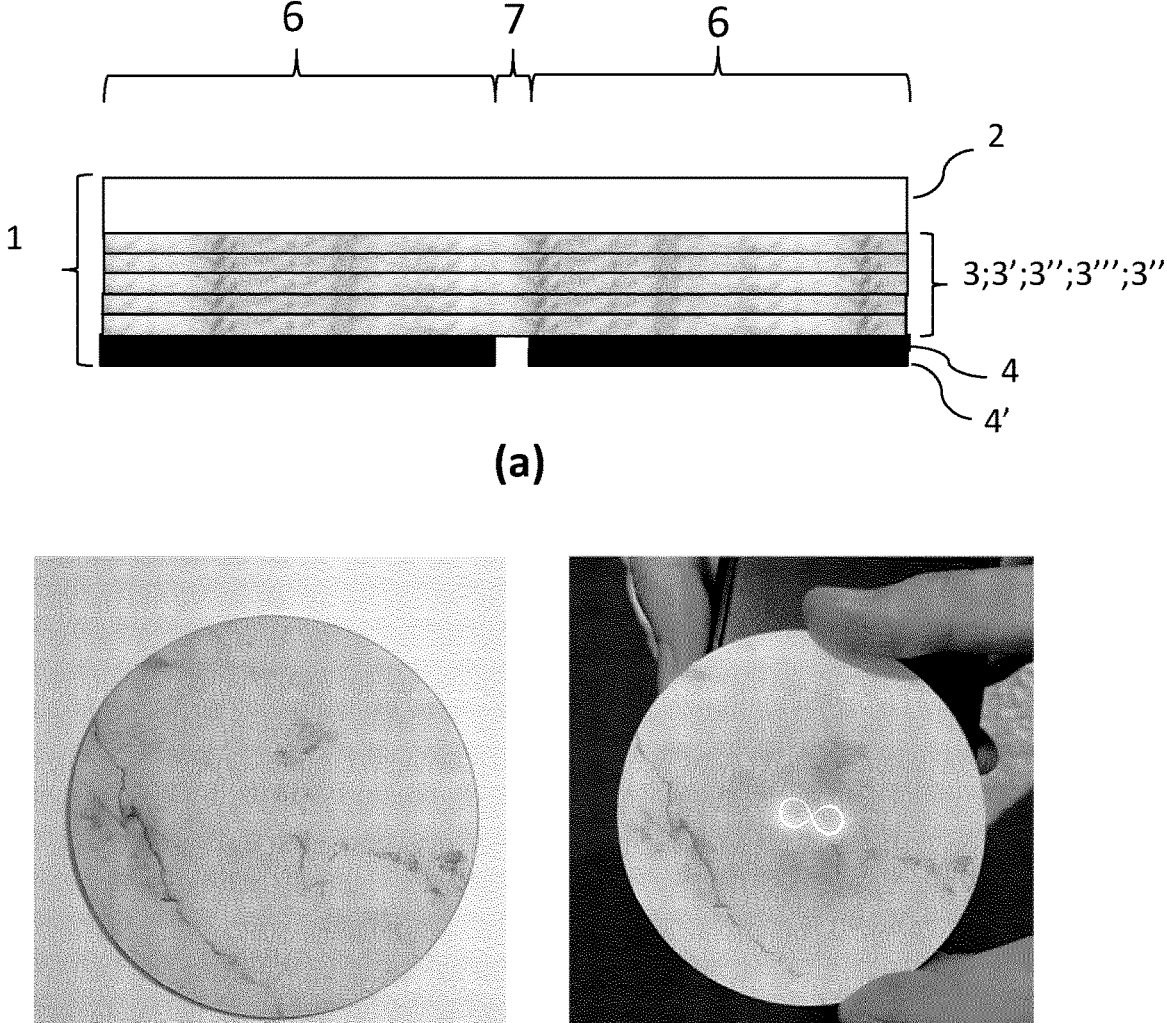
FIG. 4(*a*) illustrates schematically the specific assembly related to the glass panel of Example 1.

FIGS. 4(*b*)-(*c*) are pictures of a side of the glass panel of Example 1, (b) without any light source, and (c) with a light source placed behind the glass panel.

Figure 5:
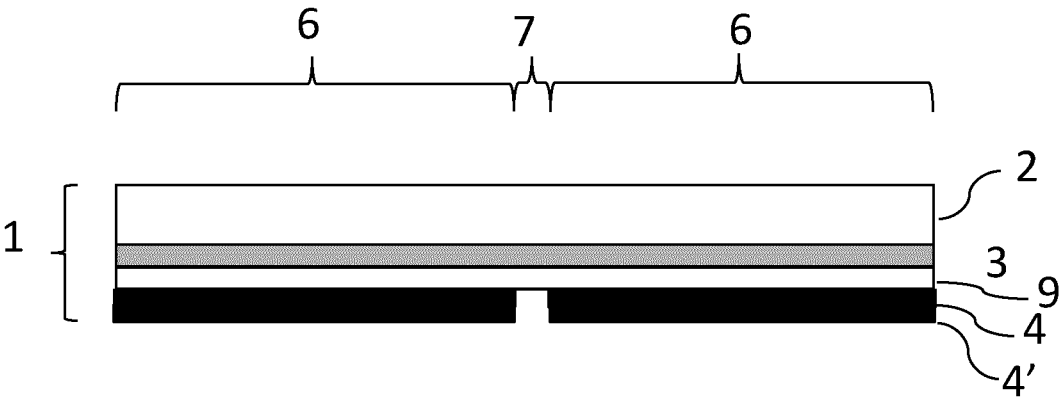
Figure 5:

FIGS. 5(*a*) illustrates schematically the specific assembly related to the glass panel of Example 2: and FIGS. 5(*b*) is a picture of the glass panel from the side of the glass sheet of Example 2.

According to the invention, the glass panel (1) has the appearance of a noble material or, in other words, mimics a noble material. By "noble material", it is meant herein, without limitation, wood, marble, stone, granite, leather, or even brushed metal/steel.

Preferably, the glass sheet (2) of the invention is made of a clear or extra-clear glass. The glass sheet (2) according to the invention has a luminous transmission LTD of at least 85%. More preferably, the glass sheet (2) according to the invention has a luminous transmission LTD of at least 87%, even of at least 88%. In a most preferred embodiment, the glass sheet (2) has a luminous transmission LTD of at least 90%. This feature allows to see clearly the noble material appearance given by the decorative layer (3) when looking through the glass panel (1) from the side of the glass sheet (2).

The glass sheet (2) according to the invention has a thickness between 0.1 and 6 mm. More preferably, for some specific applications and especially for interior vehicle's glazings, the thickness of the glass sheet (2) is between 0.3 to 2.6 mm.

According to the invention, the glass sheet (2) may be substantially flat or alternatively, it may be totally or partially curved, i.e. to fit with a particular requested 3D design of the final glass panel and/or a support if the glass panel has to be cold bent.

According to the invention, the glass sheet (2) may be hardened, or thermally tempered, or chemically strengthened.

According to the invention, the glass sheet (2) has a composition that is not particularly limited. The glass sheet (2) may be a soda-lime-silicate glass, an alumino-silicate glass, an alkali-free glass, a boro-silicate glass, etc. Preferably, the glass sheet of the invention is made of a soda-lime glass or an alumino-silicate glass. The glass sheet (2) according to the invention may be a glass sheet obtained by a floating process, a drawing process, a rolling process or any other process known to manufacture a glass sheet starting from a molten glass composition. According to a preferred embodiment according to the invention, the glass sheet is a float glass sheet. The term "float glass sheet" is understood to mean a glass sheet formed by the float glass process, which consists in pouring the molten glass onto a bath of molten tin, under reducing conditions.

According to an embodiment of the invention, the glass sheet (2) has a composition comprising, in a content expressed in percentages of the total weight of the glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |

In a preferred embodiment, the glass sheet (2) has a composition comprising, in a content expressed in percentages of the total weight of the glass:

| | |
|---|---|
| $SiO_2$ | 55-78% |
| $Al_2O_3$ | 0-18% |
| $B_2O_3$ | 0-18% |
| $Na_2O$ | 5-20% |
| CaO | 0-10% |
| MgO | 0-12% |
| $K_2O$ | 0-12% |
| BaO | 0-5%. |

In a more preferred embodiment, the glass sheet (2) has a composition comprising, in a content expressed in percentages of the total weight of the glass:

| | |
|---|---|
| $SiO_2$ | 60-78% |
| $Al_2O_3$ | 0-8% |
| $B_2O_3$ | 0-4% |
| CaO | 0-10% |
| MgO | 0-12% |
| $Na_2O$ | 5-20% |
| $K_2O$ | 0-12% |
| BaO | 0-5%. |

For example, compositions comprising the following in weight percentage, expressed with respect to the total weight of glass:

$60 \leq SiO_2 \leq 78\%$ $5 \leq Na_2O \leq 20\%$ $0.9 < K_2O \leq 12\%$ $4.9 \leq Al_2O_3 \leq 8\%$ $0.4 < CaO < 2\%$ $4 < MgO \leq 12\%$, are particularly advantageous.

Other advantageous examples of compositions for the glass sheet (2) of the invention are described in the published patent applications WO2015/150207 A1, WO2016/169823 A1 and WO2018/001965 A1.

According to the invention, the glass panel comprises a decorative layer (3) representing the noble material image and which is continuous. This decorative layer allows to bring the appearance of the desired noble material to the glass panel of the invention.

Preferably, the decorative layer (3) covers the glass sheet on essentially its whole surface. By essentially the whole surface, it is meant more than 90% of the surface of the glass sheet and, preferably, more than 95 or even 98%.

Alternatively, the decorative layer (3) covers the glass sheet on a part of its surface. Such an embodiment is advantageous, for example, if one combine the glass panel of the invention with a display a smaller size than the glass sheet. In such a case, the decorative layer (3) should not overlap substantially the display, when looking from the side of the glass sheet.

Preferably also, the decorative layer (3) is an ink layer, a lacquer, an enamel or a paint. More preferably, the decorative layer (3) is an UV-ink layer. The decorative layer (3) may be deposited on the glass sheet by any manner known in the art. Non-limiting examples of deposition process for the decorative layer (3) are inkjet printing, laser printing or screen-printing methods. Preferred method for depositing the decorative layer (3) of the invention is inkjet printing, mainly thanks to its capability to produce high quality coloured patterns, its flexibility and its high deposition speed.

Alternatively, The decorative layer (3) may also be a film of polymers, which may then deposited by a classical lamination process.

According to another embodiment, the glass panel comprises more than one decorative layer (3). Such an embodiment is advantageous in order to improve further the aesthetical rendering of the noble material image, especially if this material is of light color (i.e. white marble). Two or three, and i.e. up to five decorative layers may be present on the glass panel. The layers may have the same thickness or not.

The decorative layer (3) (or the assembly of more than one decorative layer) may have a thickness of from 1 to 200 micrometers. Preferably, the decorative layer (3) (or the assembly of more than one decorative layers) has a thickness below 100 micrometers, or even below 50 microns.

According to an embodiment, the decorative layer (3) is in direct contact with the glass sheet (2).

Alternatively, according to an advantageous embodiment, the glass panel (1) may further comprise an adhesion layer between the glass sheet (2) and the decorative layer (3), to increase to strength of adhesion between the glass and the layer. More preferably, the adhesion layer is transparent. Examples of such adhesion layers are those described in the published patent application WO2010/115858 A1. A silane primer may also be used, for the same purpose, between the glass sheet (2) and the decorative layer (3) or, alternatively, between the glass sheet and the adhesion layer, if any.

The noble material appearance/image imparted by the decorative layer (3) may be the same over the entirety of said layer, or, alternatively, the decorative layer (3) may have different image. For example, one can have a wood appearance in the center of the layer, and thereby in the center of the glass panel, and a brushed steel appearance at its periphery forming a frame with a different look.

Figure 1:
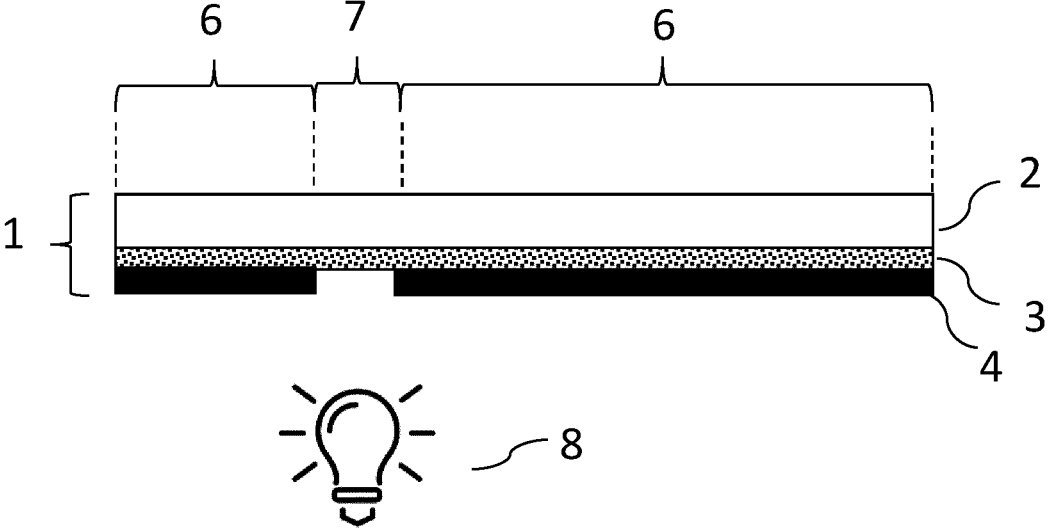
Figure 2:
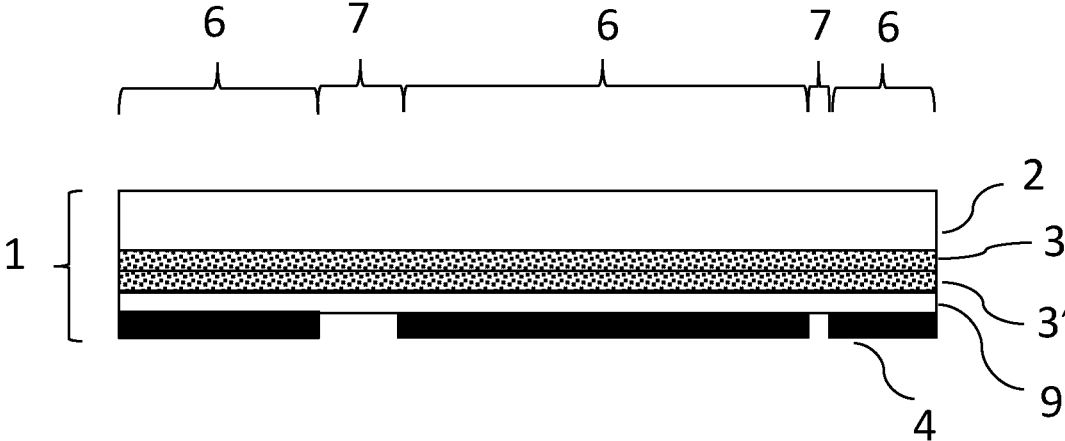

According to an embodiment and as illustrated at FIG. 2, an additional decorative layer (3') may be deposited over the decorative layer (3), so as to improve further the noble material appearance of the glass panel (1). Preferably, this additional decorative layer (3') is of the same nature as the decorative layer (3) and is deposited by the same method. However, its thickness may be different but also in the range 1-200 micrometers, and more preferably, below 100 micrometers, or even below 50 microns.

According to the invention, the glass panel comprises an opaque top layer (4) which is discontinuous. In other words, the opaque top layer (4) does not cover the decorative layer (3) in its entirety and has a part or some parts that is/are non-coated or de-coated.

Preferably, it is dark-coloured and, more preferably, it is black.

The non-coated or de-coated part(s) in the top layer (4) corresponds to the sign/pattern/logo that one wants to be visualized through the glass panel from the glass side, when it is back-lighted from the side opposite to the glass sheet.

This discontinuous opaque top layer (4) gives therefore a glass panel showing (i) "opaque zones" (6), and (ii) "semi-transparent zones" (7) that correspond to the non-coated/de-coated part(s) in the top layer (and to the desired sign/pattern/logo).

According to an embodiment, the glass panel (1) comprises more than one top layer (4). Such an embodiment is advantageous in order to improve further the aesthetical rendering of glass panel. Two or three top layers may be present on the glass panel. The layers may have the same thickness or not.

The top layer (4) (or the assembly of more than one decorative top layer) may have a thickness of from 1 to 200 micrometers. Preferably, the top layer (or the assembly of more than one top layer) has a thickness below 100 micrometers, or even below 50 microns.

Preferably, the top layer (4) is an ink layer, a lacquer, an enamel or a paint. In such a case, the top layer (4) may be deposited by any suitable manner known in the art. According to the invention, the top layer (4) is discontinuous, which means that a part or some parts of the coating is either not coated (one-step partial/selective coating) or de-coated (coating step following by a de-coating step). In the case of a one-step partial coating, example of deposition methods are inkjet, laser and screen printing methods. In the case of a two-steps process, the deposition of the layer may be done by inkjet, laser or screen printing method, but also by roller coating, bar coating and curtain coating methods. The de-coating step to form the discontinuity in the top layer may be done classically by laser, for example.

Alternatively, the top layer (4) may also be a film of polymers, which may then deposited by a classical lamination process.

Preferred method for manufacturing the glass panel (1) of the invention is the same as that used for the decorative layer (3), so as to have a more efficient process/manufacturing line.

Preferably, according to an embodiment, the opaque zones (6) are defined by an optical density OD>2. More preferably, the opaque zones (6) are defined by an optical density OD>3, or better >4.

Preferably also, according to an embodiment, the semi-transparent zones (7) are defined by a luminous transmission $LTD \geq 5\%$. More preferably, the semi-transparent zones (7) are defined by a luminous transmission $LTD \geq 10\%$.

According to another embodiment, the semi-transparent zones (7) are defined by a luminous transmission $\leq 75\%$, or better $\leq 70\%$. More preferably, the semi-transparent zones (7) are defined by a luminous transmission $LTD \leq 60$ or better, 50%.

According to an advantageous embodiment, the glass panel (1) further comprises at least one intermediate layer (9) between the decorative layer(s) (3, 3') and the top layer (4), which is continuous and showing absolute values for a* and b* parameters<2.5.

Because of the opacity of the top layer, this additional layer, due do its lighter color, provides a better aesthetical rendering of the appearance/image formed by the decorative layer (3) when looking from the side of the glass sheet.

This intermediate layer (9) is preferably white-coloured. Alternatively, it is of any color allowing to improve aesthetical rendering of the appearance/image formed by the decorative layer (3).

In the same manner as the decorative layer (3), the intermediate layer (9) preferably covers essentially the whole surface of the glass sheet and thereby the whole surface of the decorative layer (3).

Preferably also, the glass panel (1) may comprise at least two intermediate layers, in order to further improve the aesthetical rendering of the noble material appearance.

The glass panel (1) according to the invention may also be coated by a functional layer on the face of the glass sheet (2) opposite to that carrying the decorative layer (3). For example, it may be coated by an antireflective, an anti-glare, an anti-scratch, an anti-fingerprint layer or any suitable layer giving the desired advantageous property to the glass surface that will be experienced by the users. It may also be treated so as to impart to the surface any desired properties like, for example, an etching treatment in order to have an anti-glare property and/or a touch/soft feeling.

One advantageous feature of the invention lies in the fact that the manufacturing of the glass panel (1) can be easily integrated in classical and standard glass processing steps like, cutting, grinding, . . . .

In particular, one can easily use the known cutting process called "piece-sheet type" method in order to retail a large glass panel into smaller pieces. In such a case, for example, a laser pre-cutting is carried out on the large mother glass sheet, then the different layers from the invention are deposited, then a chemical tempering is carried out and, afterwards, the separation of the smaller coated pieces may be operated. Such a cutting process of a painted glass panel is described in a general manner in the filed European patent application 19189604.2.

Such a laser cutting process brings a lot of advantages in present invention as:

it is a very flexible and high-precision method allowing to reach any requested size and shape (even complex),
 it respects the integrity of the paint layer,
 it does not require any grinding step,
 it is rapid, simple, efficient and less expensive, and
 it is compatible with the so-called cold-bending process, often required in the automotive glazing domain.

In particular, when the laser cutting "piece-sheet type" method is used, the invention also relates to a glass panel (1) as described above, with the glass sheet (2) having at least one edge showing:

angles formed with first and second main surfaces of said sheet each equal to 90°±7°;
 a surface roughness defined by Ra of from 0.1 to 1 microns, measured at a location along a line at sheet thickness divided by two (or sheet thickness/2).

In particular also, when the laser cutting piece-sheet type method process is used and if a chemical strengthening step is processed after pre-cutting and layer deposition but before separation of the smaller pieces, the invention also relates to a glass panel (1) as described above, with the glass sheet (2) having:

(i) a level of potassium at its first and second main surfaces than the level of potassium at its edges, and
 (ii) a level of potassium at its edges higher than the level of potassium in its bulk.

As the level of potassium at the edges of the sheet is increased, said edges are advantageously more mechanically resistant.

The present invention also relates to a glass article comprising (i) the glass panel (1) from the invention, as described above, and (ii) at least one backlighting system (8) mounted behind the glass panel from the side opposite the glass sheet (2). Such a backlighting system (8) allows, due to the semi-transparent zones (6), the visualization of an illuminated pattern from the side of the glass sheet (2) appearing through the decorative noble material layer (3) by transparence. This is illustrated at FIG. 3, showing a glass panel (1) according to the invention with the appearance of stone imparted by the decorative layer and an ON/OFF sign visible through the stone appearance by back-lighting.

Figure 3:
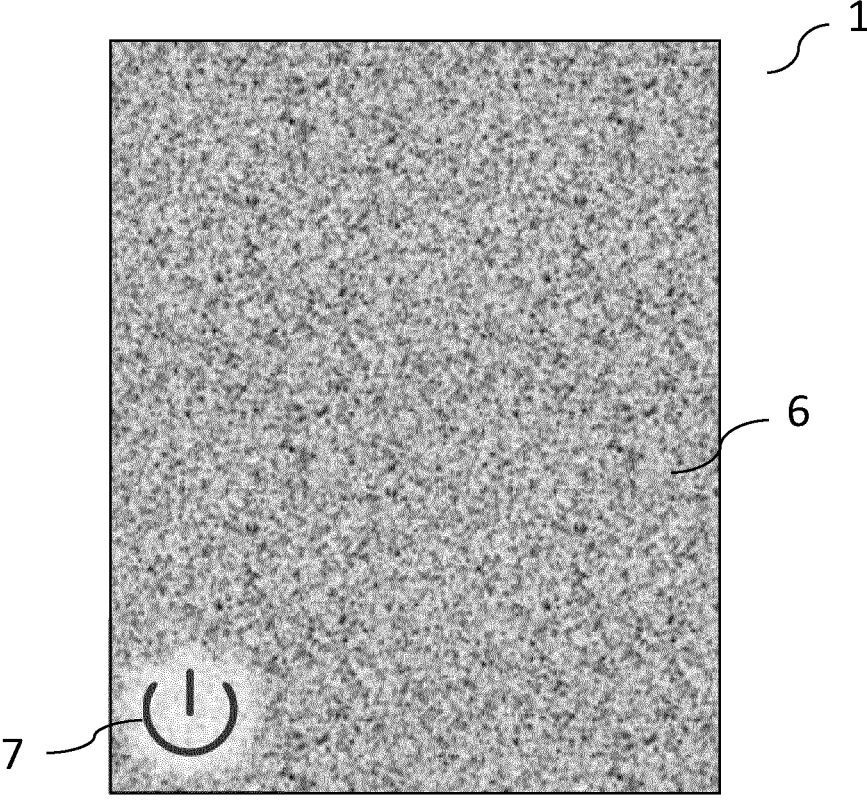
FIG. 3 shows an example of the glass panel aesthetics/appearance.

The glass article of the invention may also advantageously further comprise a touch function, which for example, can bring a local touch mode associated with the illuminated sign/logo/pattern (i.e., on/off function in FIG. 3).

Finally, the invention also relates to the use of the glass article according to the invention as vehicle's interior glazing like console, dashboard, decorative inserts . . . .

The glass article according to the invention may also be advantageously used, for example, as furniture, wardrobes, partitions, tables, shelves, wall cladding or spandrels.

EXAMPLES

Example 1

A glass panel 1 according to the invention with the appearance of white marble was manufactured as follows:

An extra-clear alumino-silicate thin glass sheet (Falcon™ glass, 1.1 mm-thickness, round-shaped 10 cm diameter, LTD 91.7%) was first coated/printed by digital inkjet printing with a Canon printer OCE Arizona, to form an image representing white marble on essentially the whole surface of the glass (decorative layer). This step was repeated in order to finally have 5 ink layers of essentially the same thickness (3;3';3";3'";3"").

The decorative layers, once dried, were then coated with two superimposed identical black-coloured top layers 4;4' (defining the "opaque zone" 6), using also the same printer. The top layers were discontinuous in exactly the same manner: a portion of the decorative layers, representing an infinity sign, was not coated (defining then a "semi-transparent zone" 7). Total thickness of the (dried) top layers was approximately 30 μm.

The OD measured for the opaque zones 6 was 1.82 (measurement made with a densitometer X-rite 361T). The luminous transmission LTD measured for the semi-transparent zone 7 was 74.8%.

FIG. 4(a) illustrates schematically the specific assembly related to the glass panel of this example 1. FIG. 4(b)-(c) show a picture of the glass panel from the side of the glass sheet, (b) without any light source and (c) with a light source placed behind the glass panel from the side opposite the glass sheet. The pictures well illustrate the nice appearance of white marble of the glass panel of the invention and the clear visualization of the infinity sign when it is back-lighted.

Example 2

A glass panel according to the invention with the appearance of medium wood was manufactured as follows:

An extra-clear alumino-silicate thin glass sheet (Falcon™ glass, 1.1 mm-thickness, round-shaped 10 cm diameter, LTD 91.7%) was first coated/printed by digital inkjet printing with a Canon printer OCE Arizona, to form an image representing wood on essentially the whole surface of the glass (decorative layer). Thickness of the (dried) decorative layer 3 was approximately 10 μm.

The decorative layer, once dried, was then fully coated with one white-coloured intermediate layer 9, with the same printer. Thickness of the (dried) intermediate layer was approximately 10 μm. Their L*a*b* parameters are the following: L*=90.69; a*=−0.71; b*=2.19.

Finally, the intermediate white layer, once dried, was then coated with two superimposed identical black-coloured top layers 4;4' (defining the "opaque zone" 6), using also the same printer. The top layers were discontinuous in exactly the same manner: a portion of the decorative layers, representing an infinity sign, was not coated (defining then a "semi-transparent zone" 7). Total thickness of the (dried) top layers was approximately 30 μm.

The OD measured for the opaque zones 6 was 3.40. The luminous transmission LTD measured for the semi-transparent zone 7 was 7.6%.

FIG. 5(*a*) illustrates schematically the specific assembly related to the glass panel of this example 2. FIG. 5(*b*) is a picture of the glass panel from the side of the glass sheet, showing the nice appearance of wood of the glass panel of the invention.

The invention claimed is:

1. A glass panel having a noble material appearance, comprising in order:
   a glass sheet having a luminous transmission LTD of at least 85% and having a thickness in a range of 0.1 mm to 6 mm;
   a decorative layer having a noble material pattern and wherein the decorative layer is continuous;
   an opaque top layer wherein the opaque top layer is discontinuous;
   wherein said glass panel thereby has:
   opaque zones defined by an optical density OD>1.5;
   semi-transparent zones that correspond to one or several patterns and defined by a luminous transmission LTD of greater than 10% and not more than 80%.

2. The glass panel of claim 1, wherein the semi-transparent zones are defined by a luminous transmission LTD of greater than 10% and not more than 50%.

3. The glass panel of claim 1, wherein the glass sheet has a thickness in a range of 0.3 to 2.6 mm.

4. The glass panel of claim 1, further comprising: at least one intermediate layer between the decorative layer and the opaque top layer, wherein the at least one intermediate layer is continuous and has absolute values for a* and b* parameters<2.5.

5. The glass panel of claim 1, wherein said glass sheet has at least one edge, wherein said at least one edge has:
   angles formed with a first and a second main surface of said glass sheet each equal to 90°±7°; and
   a surface roughness defined by Ra of from 0.1 to 1 microns, measured at a location along a line at sheet thickness divided by two (or sheet thickness/2).

6. The glass panel of claim 1, wherein said glass sheet is chemically strengthened.

7. The glass panel of claim 6, wherein said glass sheet has:
   a level of potassium at a first and a second main surface higher than a level of potassium at an edge, and
   a level of potassium at an edge higher than a level of potassium in a bulk.

8. A glass article, comprising:
   the glass panel of claim 1; and
   at least one backlighting system mounted behind the glass panel from a side opposite the glass sheet.

9. The glass article of claim 8, wherein the glass article is a vehicle's interior glazing.

10. A glass panel having a noble material appearance, comprising in order:

a glass sheet having a luminous transmission LTD of at least 85% and having a thickness in a range of 0.1 mm to 6 mm;
   a decorative layer having a noble material pattern and wherein the decorative layer is continuous;
   an opaque top layer wherein the opaque top layer is discontinuous;
   wherein said glass panel thereby has:
   opaque zones defined by an optical density OD>1.5; and
   semi-transparent zones that correspond to one or several patterns and defined by a luminous transmission LTD from 3 to 80%; and
   wherein said glass sheet has at least one edge, wherein said at least one edge has:
   angles formed with a first and a second main surface of said glass sheet each equal to 90°±7°; and
   a surface roughness defined by Ra of from 0.1 to 1 microns, measured at a location along a line at sheet thickness divided by two (or sheet thickness/2).

11. The glass panel of claim 10, wherein the semi-transparent zones are defined by an optical density OD>2.

12. The glass panel of claim 10, wherein the semi-transparent zones are defined by an optical density OD>3.

13. The glass panel of claim 10, wherein the glass sheet has a thickness in a range of 0.3 to 2.6 mm.

14. The glass panel of claim 10, further comprising: at least one intermediate layer between the decorative layer and the opaque top layer, wherein the at least one intermediate layer is continuous and has absolute values for a* and b* parameters<2.5.

15. A glass panel having a noble material appearance, comprising in order:
   a glass sheet having a luminous transmission LTD of at least 85% and having a thickness in a range of 0.1 mm to 6 mm;
   a decorative layer having a noble material pattern and wherein the decorative layer is continuous;
   an opaque top layer wherein the opaque top layer is discontinuous;
   wherein said glass panel thereby has:
   opaque zones defined by an optical density OD>1.5; and
   semi-transparent zones that correspond to one or several patterns and defined by a luminous transmission LTD from 3 to 80%;
   wherein said glass sheet is chemically strengthened, and wherein said glass sheet has:
   a level of potassium at a first and a second main surface higher than a level of potassium at an edge, and
   a level of potassium at an edge higher than a level of potassium in a bulk.

16. The glass panel of claim 15, wherein the semi-transparent zones are defined by an optical density OD>2.

17. The glass panel of claim 15, wherein the semi-transparent zones are defined by an optical density OD>3.

18. The glass panel of claim 15, wherein the glass sheet has a thickness in a range of 0.3 to 2.6 mm.

19. The glass panel of claim 15, further comprising: at least one intermediate layer between the decorative layer and the opaque top layer, wherein the at least one intermediate layer is continuous and has absolute values for a* and b* parameters<2.5.

* * * * *